United States Patent [19]

Nierman

[11] 3,975,167

[45] Aug. 17, 1976

[54] TRANSPORTATION OF NATURAL GAS AS A HYDRATE

[75] Inventor: Albert J. Nierman, Dhahran, Saudi Arabia

[73] Assignee: Chevron Research Company, San Francisco, Calif.

[22] Filed: Apr. 2, 1975

[21] Appl. No.: 564,394

[52] U.S. Cl. .................................. 48/190; 62/10; 62/48; 62/240; 114/16 R; 114/74 A; 260/676 H
[51] Int. Cl.² ........................................ F17C 13/00
[58] Field of Search ................ 48/190, 196 R; 62/1, 62/8, 10, 12, 45, 46, 47, 48, 240; 260/676 H; 114/16 R, 74 A

[56] References Cited
UNITED STATES PATENTS

| | | | |
|---|---|---|---|
| 2,270,016 | 1/1942 | Beneshi | 48/190 |
| 2,356,407 | 8/1944 | Hutchinson | 48/190 |
| 2,399,723 | 5/1946 | Crowther | 48/190 |
| 2,938,359 | 5/1960 | Cobb et al. | 62/47 |
| 3,514,274 | 5/1970 | Cahn et al. | 48/190 |
| 3,888,434 | 6/1975 | Chersky et al. | 48/190 |

Primary Examiner—S. Leon Bashore
Assistant Examiner—Peter F. Kratz
Attorney, Agent, or Firm—R. L. Freeland, Jr.; R. T. Kloeppel

[57] ABSTRACT

A method and apparatus is described for transporting a natural gas in the form of a hydrate. The method utilizes the pressure and temperature conditions of a submerged vessel to facilitate the formation and maintenance of natural gas as a hydrate during the subsea voyage and the subsequent reconversion of the hydrate to a natural gas when the destination of the vessel is reached.

The submarine vessel can have: supplementary refrigeration, a hold or void in which a natural gas is hydrated, and a membrane pervious to gas and water within the hold. In the vicinity of the hold bottom are situated gas conductors with spargers through which the natural gas is pumped into the hold. Adjacent to them are cold-water distributor pipes through which water is pumped into the hold for forming a gas hydrate and for removing the heat of formation.

The membrane is spaced from the interior wall of the hold so that a gap around and within the hold is formed. This gap provides a path for the water and gas to travel upward to an exit conduit located near the top of the vessel. From this conduit, the gas and water is recycled to form a hydrate.

30 Claims, 4 Drawing Figures

TRANSPORTATION OF NATURAL GAS AS A HYDRATE

BACKGROUND OF THE INVENTION

1. Field of the Invention

The present invention relates to a method and apparatus for hydrating and transporting natural gas in the form of a hydrate. More particularly, the method and apparatus utilize the pressure and temperature conditions surrounding a submerged vessel to facilitate, maintain and reconvert a natural gas to and from a hydrate.

2. Description of the Prior Art

The knowledge that a natural gas is usable as a fuel has been known, as well as used as such, for a long time. A problem associated with its use is transporting if from the source to another place, since it ordinarily occupies a larger volume per available Btu than other fuels that are solid or liquid. One manner of overcoming this problem is to increase it pressure in the transfer container. Alternatively, the natural gas industry has utilized the process of reducing the temperature until the gas becomes a liquid at a predetermined pressure. This method results in liquid natural gas, LNG. Another way that is being considered by the natural gas industry is to partially oxidize methane, the major constituent of natural gas, to methanol in order to produce an easily transportable liquid.

In the first method—utilizing increased pressure—heavy containment devices are necessary. They are expensive to construct and, in the case of marine transport, difficult to maintain the requisite pressure. Likewise, if this method is used in the form of a cross-country pipeline, large compressors are necessary. This arrangement results in a large consumption of the natural gas itself to provide the pressure differential that moves the gas through the pipeline.

In the second method—manufacturing LNG—there is a very high investment required for the processing plant as well as the tankship, because of the equipment necessary to liquefy methane at low temperatures. As a result, large refrigeration loads utilize much of the gas sought to be transported. For instance, to convert a natural gas to a liquid consumes 12% to 14% of the gas. Another 6% to 8% of the source gas boils off during the sea transportation, though it is possible to utilize a portion of this boiled-off gas as a boiler fuel.

The third process—converting natural gas to methanol—also requires capital investments similar to those of LNG manufacture. Noteworthy of the conversion to methanol is that the conversion destroys up to 47% of the calorific value of the source gas.

SUMMARY OF THE INVENTION

According to the present invention, a method is devised whereby the amount of energy and equipment required to hydrate and dehydrate a natural gas is significantly reduced. Consequently, not only does the invention eliminate considerable amount of costly equipment, but there are also substantial savings in energy costs.

The invention utilizes the effects of pressure and temperature of the water of the particular depth of the vessel's submergence. Specifically, a vessel is lowered to a depth at which the pressure and the temperature is suitable, or nearly so, for hydrating natural gas. Then the natural gas is transferred aboard the ship from a reservoir or a well located nearby and it is sparged with cooling water as required or otherwise intimately contacted with water to form a hydrate. Once the hydrate is formed, the vessel is relocated while keeping the natural gas in a hydrate form to the desired site. Upon its arrival there, the vessel can be raised in the water to decrease the pressure and increase the temperature to facilitate reconverting the hydrate to the natural gas it originally was. During and after such reconversion, the natural gas is transferred to the marketing site or in some cases a storage area.

Alternatively, some natural gas may be transferred aboard the vessel prior to lowering. This natural gas may be compressed or liquefied by conventional methods.

In case the water elevation of the vessel does not provide adequate pressure and temperature to carry out the conversion or reconversion of the gas to the required form, supplementary means for appropriately varying them can be provided aboard the transporting vessel. Such means may be as insignificant as insulating the submerged vessel either internally or externally of the holding tank for the natural gas. Or it may be as sophisticated as circulating the surrounding waters through the holding tank in appropriate conduits to transfer the heat given off by the exothermic reaction of hydration, or adding heat required by the endothermic reaction or dehydration.

The submarine vessel mentioned above can have: supplementary refrigeration, a hold or void (a fluid-tight compartment) in which a natural gas is hydrated, and a membrane pervious to gas and water within the hold. In the vicinity of the hold bottom are situated gas conductors with spargers through which the natural gas is pumped into the hold. Adjacent to them are cold-water distributor pipes through which water is pumped into the hold for forming a gas hydrate and for removing the heat of formation. The membrane is spaced from the interior wall of the hold so that a gap around and within the hold is formed. This gap provides a path for the water and gas to travel upward to an exit conduit located near the top of the vessel. From here, the gas and water is recycled to form a hydrate.

DESCRIPTION OF THE PREFERRED EMBODIMENT

Figure 1:
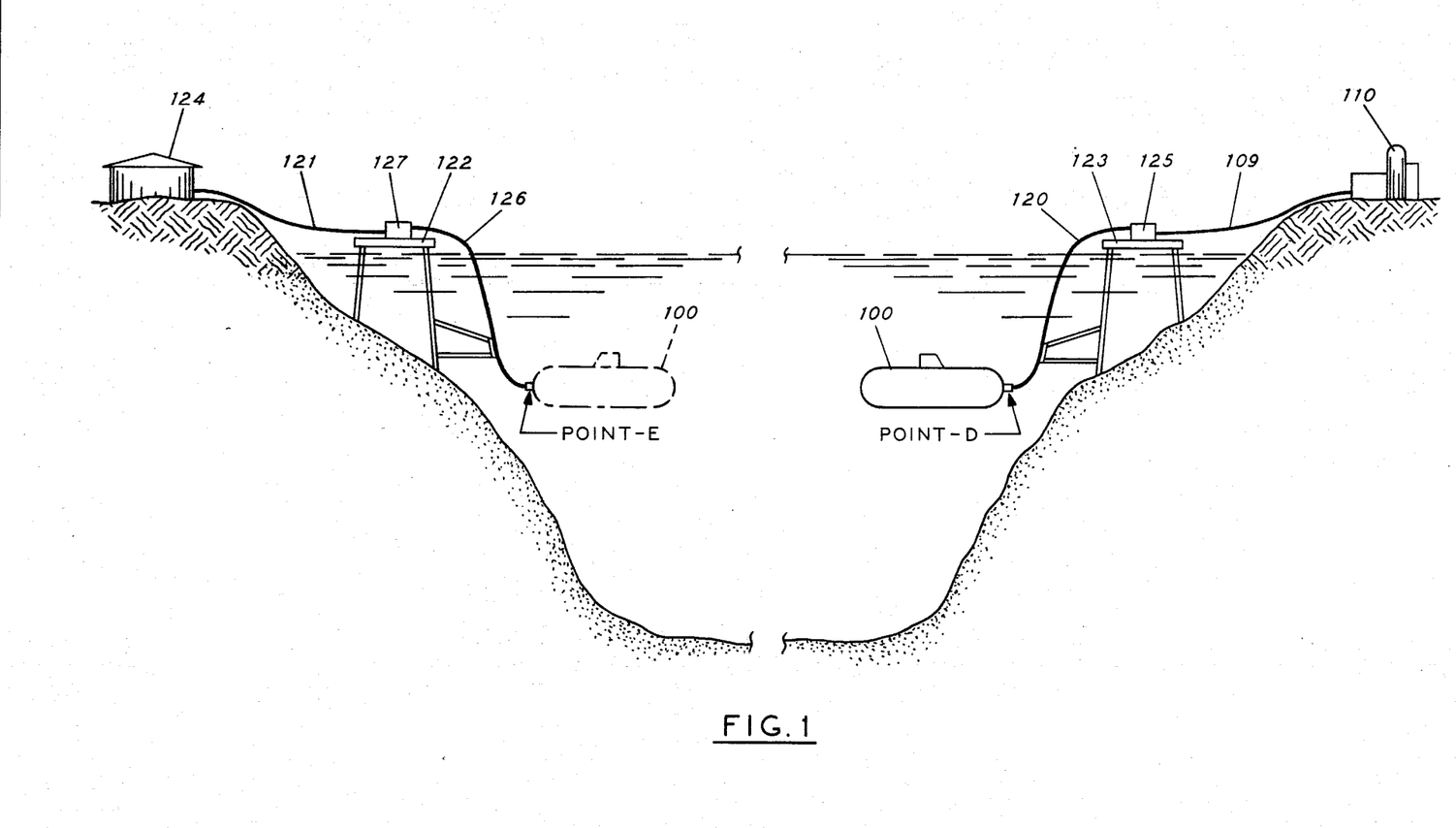
FIG. 1 is a schematic illustration of a submarine vessel located beneath the water surface and interconnected by a pipeline to an onshore gas processng plant.

An initial step of the preferred method is to lower the vessel 100 to a point D, FIG. 1, where sufficient pressure from the water is achieved. Simultaneously, at such a depth it is desirable that the temperature of the surrounding water be suitable for the hydration process. Examples of the desirable temperature and pressure variations are given and elaborated on below.

For example, a gas of 90% methane, 9.5% ethane, and 0.5% propane may be transferred through pipeline 109, pump 125 and pipeline 120 to the submerged vessel 100 moored to an offshore terminal 123 from an onshore gas processing plant 110. A thermodynamic derivation indicates that hydration of this gas will start when the temperature is 40°F and the pressure is at 267 psia. Alternatively, if the pressure is 600 psia, hydration starts at 52°F, but a temperature of 42.5°F is required to solidify the total gas stream. The final pressure and temperature conditions, however, should be respectively higher and lower to provide a driving force for the conversion. Thus, 600 psi and 40°F is recommended, though the entire process could be conducted in the temperature range of 35°F to 125°F and a pressure range of 150 psia to 1038 psia (alternatively 1300 feet to 2000 feet).

With respect to the temperature, it is noteworthy that the contacting temperature for making the natural gas hydrate is desirably near or above the freezing point of water, e.g., temperature of about 35°F is satisfactory. This is achievable at a depth of 2000 feet (approximately 880 psig). Ordinarily at 2000 feet the temperature rarely exceeds 50°F and is more likely around 40°F. Such conditions are available on voyages between Seward, Alaska, and Los Angeles, Calif. This route provides sufficient water temperature and depths to preserve a hydrate at 800 psia and 46°F or even at 600 psia and 41°F.

The components of the natural gas are also an important consideration. For instance, if nitrogen is present, an increased pressure is required for a given quantity of solidification since this component is detrimental to complete solidification. The quantity of residue gas that cannot be solidified is approximately 3 times the nitrogen gas content. Additionally, it is preferable that the natural gas be free of $CO_2$, $H_2S$, butanes, most of the propane, as well as most hydrocarbons heavier than normal butane prior to processing. The reason is that these compounds, which have different properties, are likely to form a hydrate yielding unpredictable results owing to the possible coexistance of 3 phases. In this respect, preprocessing for the subsequent hydrate conversion is similar to LNG requirements.

Furthermore, at a given pressure, ethane hydrates at a higher temperature than methane, while requiring one and a half times more water. But these requirements are substantially offset by having approximately one and three quarters more heating or calorific value. Thus, ethane actually improves the economic advantages of the present invention. On the other hand, the presence of propane is not as favorable because it requires nearly three and a half times as much water with only two and a half times the calorific value of methane. Yet the presence of some propane is tolerable.

Another factor controlling the rate of reaction is the film resistance of water to hydrocarbon gases. Hydrocarbon solubility in water is very low. But by continuously removing the hydrocarbon molecules from the water phase by forming hydrates, the equilibrium is shifted to favor hydration. Thus, both large mass-transfer areas [finely divided water phase] and agitation of the aqueous phase to bring hydrocarbon molecules in contact with hydrate crystal structures being formed are beneficial for hydrate formation.

In short, sparging of the gas stream to the liquid phase is an effective way of accomplishing the goal of forming a hydrate quickly. Excess water, however, is necessary for this to be a satisfactory solution. Other alternatives that facilitate hydration are small amounts of alcohol or soaps in the water, or the utilization of an emulsion of water in mineral oil.

Figure 2:
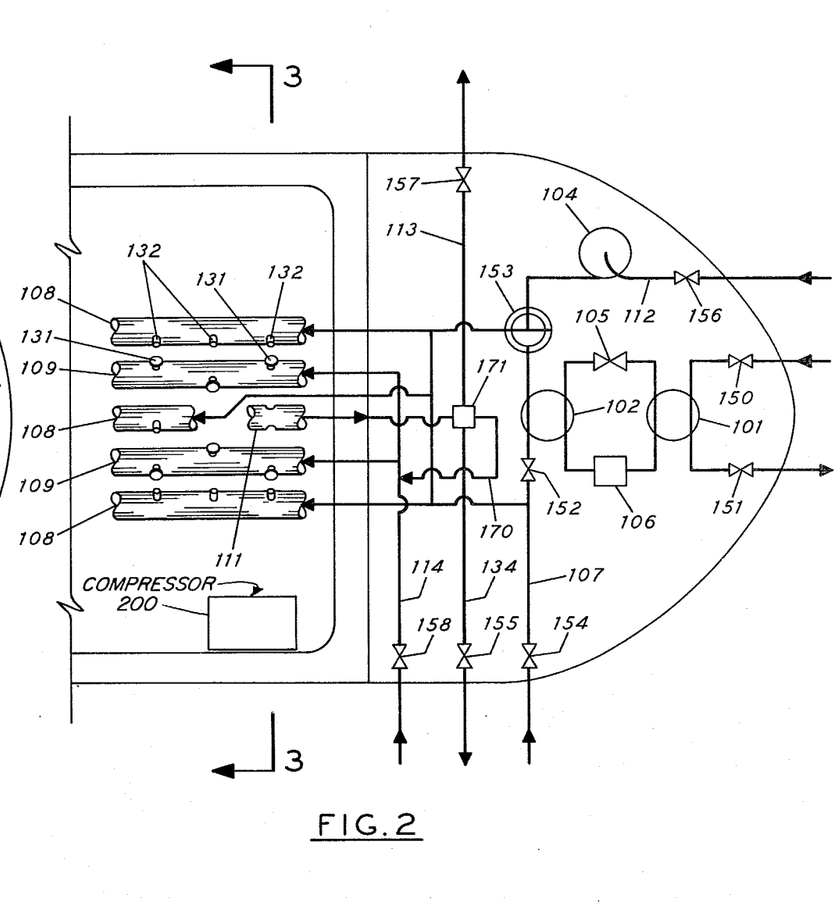
FIG. 2 is a simplified flow schematic of the hydrate process cycle in water depth of 1500 feet. A cutaway plan view of the vessel is also illustrated.
Figure 3:
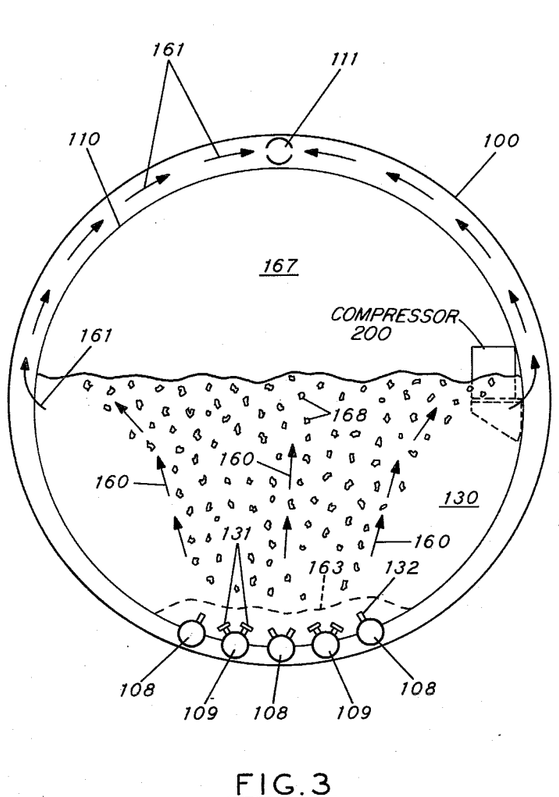
FIG. 3 is a schematic illustration of a cross section of the vessel taken along section line 3—3, FIG. 2.

Referring specifically to FIGS. 2 and 3, an outline of the submarine vessel, which may be self-propelled or towable, is indicated by number 100. Gas is introduced from the surface through intake 114 through valve 158 into conductor 109. From here it is sparged through spargers 131 into the cold water 130 contained in the vessel 100. This water may be there from a prior run or added at the loading dock, point D, FIG. 1.

Gas hydrate crystals are formed upon contact of the gas with the cold water. Additional cold water is jetted into the region of formation of the hydrate in order to remove heat of formation. the hydrate crystals 168 by virtue of their low specific gravity relative to water float upward. They are retained at the upper part of the vessel by a porous membrane 110 (pervious to water and gas). In this location they form a semi-solid mass 167 which builds downward as the vessel is loaded. The lower limit of this mass is approximated by dashed line 163.

Within the submarine 100, FIGS. 2 and 3, are three systems for producing and maintaining the low temperatures required for producing and preserving the gas hydrate. The first of these can be used at the point of loading. In this case, valves 154 and 155 are opened, and cold water is pumped from surface refrigeration facilities to the vessel through pipeline 107 and cold water water distributors 108. The water is jetted through nozzles 132 on the distributors 108 (opposite the gas spargers 131) into the region of hydrate formation. It then passes upward with the hydrate (indicated by arrows numbered 160, FIG. 3) and passes through permeable membrane 110 (indicated by arrows numbered 161, FIG. 3). From here it returns through the collector pipe 111 at the top of the vessel. Then it passes through gas separator 171 which separates out any excess gas from the water. The gas is returned through pipe 170 for recycling and the water is returned to onshore facilities through pipe 134.

The second system can be used in transit through sea water cold enough to prevent melting of the hydrate at the ambient pressure, such as 42°F and 600 psia. Valves 156 and 157 are opened and sea water is induced through intake 112 and pumped (by pump 104) through cold water distributors 108 out collector 111 and returned to the sea through outlet 113.

The third system can be used in transit through sea water too warm to prevent melting of the hydrate. For instance, a simple closed-circuit vapor-compression system can be used for refrigeration—though other refrigeration systems are usable.

In the closed-circuit system, FIG. 2, the refrigerant may be propane while the coolant is water at a water depth of 1500 feet (pressure of approximately 650 psia in fresh water). The coolant has an entrance temperature of 55°F at valve 150. And at valve 151 it has an exit temperature of 65°F after passing through a condenser 101. The condenser condenses the refrigerant before it is throttled through expansion valve 105 where its temperature is reduced to 29°F. While changing from a liquid to a vapor, the refrigerant is utilized to cool down the water passing through chiller 102 from 42.8°F to 34°F. The vaporized refrigerant is then passed through the compressor 106 at a higher pressure and temperature so that it will liquefy at atmospheric pressure. With valve 153 closed and valve 152 open, water is induced through intake 112 into chiller 102.

From here, the newly chilled water increases in temperature one degree due to heat transfer gains to the water from its surroundings as it flows from the exit of the chiller 102 into cold water distributors 108. As before, this water moves through membrane 110 to collector pipe 111 and outlet 113.

As an alternative to using refrigeration described above, an external water layer (not illustrated) between the vessel hull and the cargo hold is chilled as low as possible, e.g., 32°F, to form slush ice before leaving the loading point D, FIG. 1. With proper insulation in combinaton with the slush layer, hydrate reconversion during a voyage is minimized because heat gains of the hydrate are reduced.

When the vessel 100 is at the desired site (Point E, FIG. 1), it is raised to a depth where the water pressure is less than required to preserve the hydrate. Thus the hydrate melts. During this stage, the reconversion process is slowed down unless more heat is added, since the reverse process is endothermic. To provide this heat, the warmer water the vessel is in is circulated through the water or ice layer formed between the cargo and vessel hull 100. With the hydrate converted to a natural gas, the gas is pumped through pipelines 121, 126 by pump 127 mounted on the offshore platform 122 to a tank 124.

Figure 4:
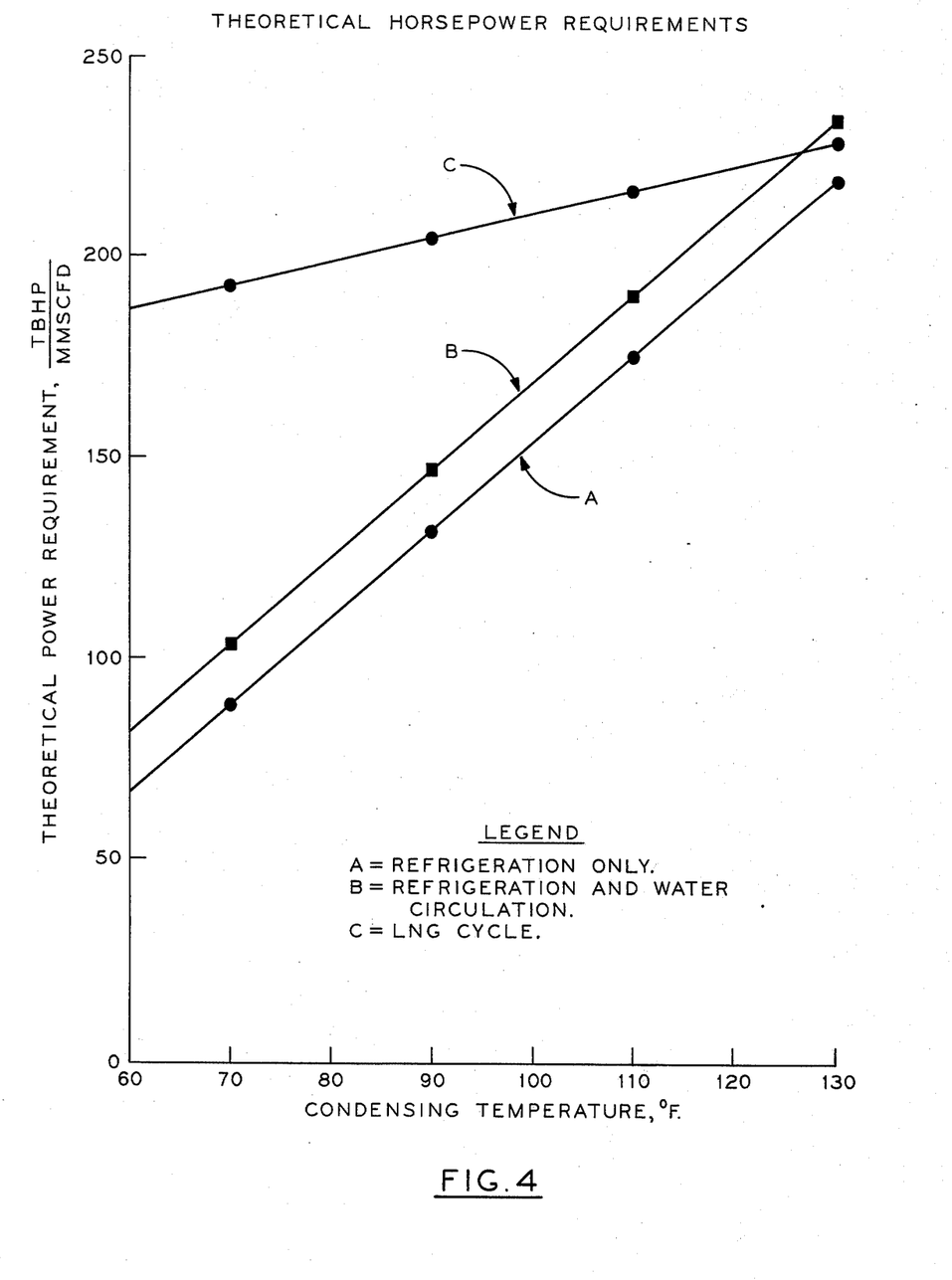
FIG. 4 graphically illustrates the energy requirements for a liquid gas system and a hydrate system at the conditions of FIG. 2.

The theoretical energy requirements for the liquefaction, based on a modified ideal cascade system, as compared to hydration of a methane flow of one million standard cubic feet per day (MMSCFD) as a function of initial condensing temperature is graphically shown in FIG. 4. Along a horizontal axis is plotted the condensing temperature and along a vertical axis is plotted theoretical brake horsepower per MMSCFD, where $$\frac{TBHP}{MMSCFD} = \frac{Q_2}{2547}\left(\frac{T_1 - T_2}{T_2}\right)$$

In the equation, $Q_2$ is the heat-extracted Btu/hr/MMSCFD. $T_2$ is the absolute temperature of the boiling refrigerant, °R. And $T_1$ is the condensing temperature of the refrigerant, °R. In both curves on the graph of FIG. 4 and as noted above, the only variable is condensing temperature; all other conditions are as set out in the preceding paragraphs.

The theoretical energy requirements for the liquefaction cycle are based on a cascade process using 3 trains having one or more stages in combination with aftercooling. There are other known systems, such as either the Hampson-Linde or the Claude System to achieve liquefaction of a natural gas. They were not chosen, however, because the cascade process expands only liquids; thus it is less irreversible with consequent greater power economy.

The following briefly describes derivation of the point on the graph for liquefaction whose abscissa, condensing temperature, is 70°F. In the first train, the methane stream is initially cooled down by evaporating propane, which is in turn compressed and liquefied in an after-cooler using water as a coolant. The stream then passes to the second train, where the stream is additionally cooled by evaporating ethylene, in turn liquefied by evaporating propane, followed by the propane being liquefied by water cooling. The methane stream finally becomes a liquid at 201°F and 14.7 psia. This is achieved in the third train by the evaporation of methane, which is liquefied by evaporating ethylene, in turn liquefied by evaporating propane. The propane in turn is liquefied by water cooling. A summary of the conditions at the various points in each stage is shown below:

SUMMARY OF CASCADE PROCESS

|  | Train 1 | | | | Train 2 | | | | Train 3 | | | |
|---|---|---|---|---|---|---|---|---|---|---|---|---|
|  | Tin, °R | Tout, °R | ΔH=$Q_2$ MBH MMSCFD | TBHP MMSCFD | Tin, °R | Tout, °R | ΔH=$Q_2$ MBH MMSCFD | TBHP MMSCFD | Tin, °R | Tout, °R | ΔH=$Q_2$ MBH MMSCFD | TBHP MMSCFD |
| Methane Stream Aftercooler | 520 | 426 | 183.2 | — | 426 | 310 | 348.8 | — | 310 | 201 | 129.5 | — |
| Coolant—water | 515 | 525 | — | — | 515 | 525 | — | — | 515 | 525 | — | — |
| Stage  Refrigerant | | | | | | | | | | | | |
| 1  Propane | 530 | 416 | — | 13.9 | 530 | 416 | — | 37.5 | 530 | 416 | — | 19.7 |
| 2  Ethylene | — | — | — | — | 421 | 305 | — | 52.1 | 421 | 305 | — | 27.4 |
| 3  Methane | — | — | — | — | — | — | — | — | 310 | 196 | — | 41.8 |
| Subtotal TBHP | | | | 13.9 | | | | 89.6 | | | | 88.9 |
| TOTAL TBHP | | | | | | | | | | | | 192.4 |

Abbreviations:  Tin = Temperature in, $T_1$
Tout = Temperature out, $T_2$
ΔH = Change in Ethalphy from a Mollier diagram with Btu/Hr converted to MBH/MMSCFD
°R = Degrees Rankine
MBH/MMSCFD = Thousands Btu per hour per million standard cubic feet per day. For methane, this is derived as follows:

$$\left(\frac{1}{1000}\right)\left(\frac{1,000,000 \text{ SCF}}{(379.5 \text{ SCF/mole}) \text{ day}}\right)\left(\frac{1}{24\text{-hr/day}}\right)\left(16.04 \frac{\#}{\text{mole}}\right)$$

where there are 16.04 lbs. of methane per mole and SCF is a standard cubic foot

TBHP = Theoretical brake horcepower = $\left(\frac{MBH}{MMSCFD}\right)\left(\frac{1000}{2547 \text{ Btu/Hp}}\right)$ The conditions for the closed-circuit vapor-compression cycle whose ordinate is also 70°F (530°R) are as follows:
Water depth, 1500 feet
Pressure, 650 psia
Hydrate temperature, 502°R
Sensible heat, 16.275 MBH/MMSCFD
Heat of hydration, 2687.7 MBH/MMSCFD
$Q_2$ total, 89.7 HP/MMSCFD
$Q_2$ total becomes 104.7 HP/MMSCFD when pumping power is added for circulating water. Pressure drop for water circulation is 1 psi per 100 feet of line, plus a fixed value of 20 psi for pressure drop through the condenser and through the spray header.

The conclusions drawn from the graph, FIG. 4, follow. The hydrate cycle when at 1500 feet requires 46.6% of the theoretical refrigeration energy required by an LNG cycle; see Curves A and C, FIG. 4. If pumping power for water circulation is added, the value increases to 54.4%, Curve B, FIG. 4.

Another way of comparing a hydrate process and a liquid natural gas process is to compare total Btu requirements. For the hydrate process, they are about 5 times greater than for the manufacture of liquid natural gas. But, since the cooling for the hydrate is accomplished between 35°F and 125°F rather than between 100°F and −268°F, the refrigeration horsepower required to make a hydrate is ⅓ that required to make the liquid natural gas. Power requirements are even further reduced if the cooling water is at a lower temperature than the assumed conditions.

Contrasted to the above, a few subsea routes may not provide the requisite temperature and pressure. In this case, a supplemental means for regulating the pressure and temperature is used. For example, the hull of the submarine may have more or less insulation to allow for the needed heat transfer between the hold and the environment surrounding it. Likewise, an additional cooling or heating unit may be utilized to aid in hydrating and dehydrating the natural gas. A compressor 200 can also be operatively connected to the holding tank to supplement the pressure due to the water depth of the vessel.

Further, the particular equipment available for shipping the natural gas as a hydrate may make it desirable to ship the hydrate as a slurry rather than as a solid. For example, see U.S. Pat. No. 3,514,274, which deals with water-surface transporation of a hydrate slurry. The method disclosed can be made applicable with the present invention. In this method the natural gas is contacted with a $C_3$–$C_5$ hydrate within a range of 25° to 40°F at a pressure above 80 psia. The crystals formed by this contact are carried in a menstruum of liquid $C_3$–$C_5$ under controlled pressures and temperatures. The hydrate of natural gas is returned to its original state by contacting the slurry $C_3$–$C_5$ vapor at less than 80 psia at a temperature between 25° to 40°F. By utilizing this procedure with a submerged vessel to achieve the necessary pressures and temperatures, great economies result.

Although only selected embodiments of the present invention have been described in detail, the invention is not to be limited to any specific embodiment, but rather only by the scope of the appended claims.

What is claimed is:

1. A method for transporting a natural gas from a well to a point of use while utilizing the effect of pressure and temperature at the specific water elevation of a submarine vessel as an aid in hydrating said gas, comprising the steps of:
   supplying gaseous hydrate-forming hydrocarbons from a source of said gas to a submarine vessel while simultaneously pressurizing and cooling said gaseous hydrocarbons on said vessel to a temperature and pressure at which said hydrocarbons hydrate;
   hydrating said hydrocarbons in said vessel;
   submerging and moving said submarine vessel to the vicinity of a point of use while maintaining said natural gas in a hydrated form;
   raising said submarine vessel to the surface and thereby reducing the pressure and increasing the temperature of said vessel;
   providing additional heat to said vessel so that said hydrated hydrocarbons in the presence of said reduced pressure and raised temperature gasifies; and
   transferring said gasified hydrocarbons to a point of use.

2. The method of transporting the gaseous hydrate-forming hydrocarbons of claim 1 wherein the step of cooling said submarine vessel is further characterized by allowing the water surrounding said vessel to circulate through the hull of said vessel as a heat-transferring medium to said gas.

3. The method of transporting the gaseous hydrate-forming hydrocarbons of claim 2 further characterized by the step of removing from said gaseous hydrate-forming hydrocarbons butane, propane, carbon dioxide and hydrogen sulfide before hydrating said hydrocarbons.

4. The method of transporting the gaseous hydrate-forming hydrocarbons of claim 1 wherein said step of submerging said submarine vessel in said water is characterized by lowering said vessel to a depth in the range 1300 feet to 2000 feet.

5. The method of transporting the gaseous hydrate-forming hydrocarbons of claim 4 wherein said step of cooling said submarine vessel is characterized by cooling said gaseous hydrate-forming hydrocarbons to the range of 35°F to 125°F; and increasing the pressure to the range of 150 to 1038 psia.

6. A method of conveying a natural gas from a natural gas field to a point of discharge near a marketing area in a submarine vessel without using pipelines comprising the steps of:
   transferring natural gas into at least one fluid-tight compartment in said submarine vessel;
   lowering said submarine vessel to an ocean depth in the range of 1300 feet to 2000 feet;
   bringing said gas into intimate contact with a quantity of fresh water inside said vessel at said depth so as to convert a substantial portion of said gas into a hydrocarbon hydrate;
   maintaining the gas at a pressure condition and at a temperature condition necessary to keep said natural gas in a hydrated form; and
   moving said submarine vessel toward said point of marketing activity.

7. The method of claim 6 wherein the steps of:
   bringing said gas into intimate contact with a quantity of water is further characterized by said gas being sparged into a volume of water in said compartment of said vessel to form said hydrate; and
   jetting additional chilled water into a region where the step of sparging is taking place in order to absorb heat given up in hydrating said natural gas.

8. A method of moving a normally gaseous hydrate-forming hydrocarbon from one location to another in a body of water comprising the steps of:
   transferring said gaseous hydrate-forming hydrocarbon in a gaseous state to a hold in a vessel capable of submerging in the water, said vessel located on said body of water;

lowering said vessel to a water depth where there is proper pressure and temperature to promote hydration of said hydrocarbons;

sparging said hydrocarbons and fresh water in said hold to form a hydrate;

freezing an outer layer of water situated adjacent to the interior surface of said hold and said hydrocarbons to form a slush;

maintaining said temperature and pressure while simultaneously relocating said vessel;

raising said vessel to a depth so that said hydrate converts back to a gas; and transferring said gas to a second location.

9. The method of claim 8 wherein the step of raising said vessel to a depth so that said hydrate converts back to a gas is further characterized by circulating warmer sea water through said frozen water layer so as to facilitate converting said hydrate to a gas.

10. A method for transporting a natural gas in a body of water from a field site to a market site which comprises:

transferring natural gas to a vessel towable under water, said vessel being insulated to minimize heat losses;

lowering said vessel to a depth at which said natural gas forms a hydrate due to the increased pressure and reduced temperature at said depth;

cooling said natural gas with the body of water surrounding said vessel by circulating said water through said gas;

transferring said vessel to said market site while maintaining said natural gas in said hydrate form;

raising said vessel in said water to an elevation where the pressure and temperature are conducive to reconverting said hydrated form to a natural gas;

reconverting said hydrated form to natural gas; and discharging said natural gas at said market site.

11. A submergible vessel for hydrating and transporting a natural gas, comprising:

a hull capable of being submerged and relocated while submerged in a body of water so as to utilize the effects of pressure and temperature at a submerged location to assist in the forming of a hydrate from natural gas resulting in less energy consumption;

means for controlling flow of hydrate-forming natural gas into and out of said hull;

means for controlling flow of cold water into and out of said hull located on said vessel;

means for selectively jetting said water in said hull, said jetted means connected to said means for controlled flow of cold water; and means for sparging said gas through said cold water being jetting into said hull so that said natural gas forms a hydrate while at the water depth of said vessel and is storable therein while said vessel is relocated in said body of water.

12. The submergible vessel of claim 11 including:

means pervious to gas and water for separating hydrated gas from excess water and gas located within said hull so that a gap is formed between said hull and said pervious means, and means for returning said gas and water respectively to said source of gas and said source of cold water after said excess gas and water flows through said means pervious along said gap to said returning means.

13. The submergible vessel of claim 11 wherein said means for having controlled flow of cold water into and out of said hull includes means for circulating a portion of the water said vessel is submergible in, through said hull and back to said water so as to preserve said hydrated gas.

14. The submergible vessel of claim 13 including a refrigeration means for cooling said portion of water circulated through said hull if said portion of water is too warm to preserve said hydrate and supplementary pressurizing means for regulating the pressure within said hull.

15. An apparatus for hydrating and transporting a natural gas as a hydrate, comprising:

a vessel capable of submerging to depths in the region of 2000 feet;

a hold in said vessel for containing both hydrate-forming natural gas and water;

first intake means for introducing said gas from a source of said gas into said hold;

first valve means connected to said first intake means for controlling the flow of said gas into said vessel;

conductor means connected to said first intake means, said conductor means extending into said hold;

spargers connected to said conductor means for sparging said natural gas through water within said hold;

means for water flow from an onshore refrigerated water source to said vessel, said water flow means extending to said hold;

cold water distributors connected to said water flow means and extending within said hold;

nozzle means connected to said distributors for jetting water through said natural gas, said water flowing from said onshore refrigerated water source through said water flow means and cold water distributors so that said water is jetted out through said nozzle means into said gas;

second valve means, connected to said water flow means, for regulating the flow of water into said distributors;

second intake means for inducing a portion of the water surrounding said vessel through said second intake means;

third valve means, connected to said second intake means, for regulating the flow of said water through said second intake means; and pump means for inducing said water through said second intake means, said pump means connected to said second intake means.

16. The apparatus for hydrating and transporting a natural gas as a hydrate of claim 15 including:

means for regulating the temperature of said water flowing through said second intake means so that said natural gas once formed into a hydrate can be maintained as a hydrate until reconversion into a gas is desired.

17. The apparatus for hydrating and transporting a natural gas as a hydrate of claim 16 including:

a collector means for receiving excess gas and water; and a separator means for respectively returning said excess gas and water to the source of each.

18. Method of hydrating and transporting a hydratable natural gas in a vessel capable of submerging to the depths in the region of 2000 feet, comprising the steps of:

transferring said natural gas into a hull in said vessel;
lowering said vessel to a water depth in the region of 2000 feet;
opening a first valve means connected to a first intake so that said natural gas flows through said first intake and into said hull, and through a plurality of conductors connected to said first intake and from there through spargers connected to said conductors into said hull;
opening a second valve means connected to plurality of water flow pipes so that cold water can flow from an onshore refrigerated water source to said water flow pipes to said vessel through cold water distributors in said hull and from there through a plurality of nozzles connected to said distributors so that said water is jetted into said hull to form a hydrate of said natural gas;
opening a third valve means connected to a second intake so that water surrounding said submerged vessel flows through said second intake through said cold water distributors and jetted through said nozzles and then through said hydrated natural gas so that said natural gas remains hydrated during transit of said vessel to the point of use;
raising said vessel in the water while reducing the pressure and increasing temperature of said vessel;
providing additional heat to said vessel so that hydrated gas in the presence of said reduced pressure and raised temperature gasifies; and
transferring said gasified hydrate to the point of use.

19. Method of hydrating and transporting a natural gas as a hydrate of claim 18, wherein said method includes the step of regulating the temperature of said water through said second intake so that said hydrate can be maintained as a hydrate until conversion into natural gas is desired.

20. The method of hydrating and transporting a natural gas of the claim 18, wherein said method includes the steps of collecting any excess gas and water, separating said excess gas and water, and returning said gas and water to its respective source.

21. A method for transporting a natural gas from a well to a point of use while utilizing the effect of pressure and temperature at the specific water elevation of a submarine vessel as an aid in hydrating said gas, comprising the steps of:
submerging said submarine vessel;
supplying gaseous hydrate-forming hydrocarbons from a source of said gas to said submarine vessel while simultaneously pressurizing and cooling said gaseous hydrocarbons on said vessel to a temperature and pressure at which said hydrocarbons hydrate;
hydrating said hydrocarbons in said vessel;
moving said submarine vessel to the vicinity of a point of use while maintaining said natural gas in a hydrated form;
raising said submarine vessel to the surface and thereby reducing the pressure and increasing the temperature of said vessel;
providing additional heat to said vessel so that said hydrated hydrocarbons gasify in the presence of said reduced pressure and raised temperature; and
transferring said gasified hydrocarbons to a point of use.

22. The method of transporting the gaseous hydrate-forming hydrocarbons of claim 21 wherein the step of cooling said submarine vessel is further characterized by allowing the water surrounding said vessel to circulate through the hull of said vessel as a heat-transferring medium to said gas while hydrating.

23. The method of transporting the gaseous hydrate-forming hydrocarbons of claim 22 further characterized by the step of removing from said gaseous hydrate-forming hydrocarbons butane, propane, carbon dioxide and hydrogen sulfide before hydrating said hydrocarbons.

24. The method of transporting the gaseous hydrate-forming hydrocarbons of claim 21 wherein said step of submerging said submarine vessel in said water is characterized by lowering said vessel to a depth in the range of 1300 feet to 2000 feet.

25. The method of transporting the gaseous hydrate-forming hydrocarbons of claim 24 wherein said step of cooling said submarine vessel is characterized by cooling said gaseous hydrate-forming hydrocarbons to the range of 35°F to 125°F; and increasing the pressure to the range of 150 to 1038 psia.

26. A method of conveying a natural gas from a natural gas field to a point of discharge near a marketing area in a submarine vessel without using pipelines comprising the steps of:
lowering said submarine vessel to an ocean depth in the range of 1300 feet to 2000 feet;
transferring natural gas into at least one fluid-tight compartment in said submarine vessel;
bringing said gas into intimate contact with a quantity of fresh water inside said vessel at said depth so as to convert a substantial portion of said gas into a hydrocarbon hydrate;
maintaining the gas at a pressure condition and at a temperature condition necessary to keep said natural gas in a hydrated form; and
moving said submarine vessel toward said point of discharge.

27. The method of claim 26 wherein the steps of:
bringing said gas into intimate contact with a quantity of water is further characterized by said gas being sparged into a volume of water in said compartment of said vessel to form said hydrate; and
jetting additional chilled water into a region where the step of sparging is taking place in order to absorb heat given up in hydrating said natural gas.

28. A method of moving a normally gaseous hydrate-forming hydrocarbon from one location to another in a body of water comprising the steps of:
lowering a vessel to a water depth where there are proper pressure and temperature conditions to promote hydration of said hydrocarbons;
transferring said gaseous hydrate-forming hydrocarbon in a gaseous state to a hold in said vessel capable of submerging in the water, said vessel located in said body of water;
sparging said hydrocarbons and fresh water in said hold to form a hydrate;
freezing an outer layer of water situated adjacent to the interior surface of said hold and said hydrocarbons to form a slush;
maintaining said temperature and pressure conditions while simultaneously relocating said vessel;
raising said vessel to a depth so that said hydrate converts back to a gas; and
transferring said gas to a second location.

29. The method of claim 28 wherein the step of raising said vessel to a depth so that said hydrate converts back to a gas is further characterized by circulating warmer sea water through said frozen water layer so as to facilitate converting said hydrate to a gas.

30. A method for transporting a natural gas in a body of water from a field site to a market site which comprises:

lowering a vessel to a depth at which said natural gas forms a hydrate due to the increased pressure and reduced temperature at said depth;

transferring natural gas to said vessel towable under water, said vessel being insulated to minimize heat losses;

cooling said natural gas with the body of water surrounding said vessel by circulating said water through said gas;

transferring said vessel to a market site while maintaining said natural gas in said hydrate form;

raising said vessel in said water to an elevation where the pressure and temperature are conducive to reconverting said hydrated form to a natural gas;

reconverting said hydrated form to natural gas; and discharging said natural gas to said market site.

* * * * *

UNITED STATES PATENT AND TRADEMARK OFFICE
CERTIFICATE OF CORRECTION

PATENT NO. : 3,975,167
DATED : August 17, 1976
INVENTOR(S) : Albert J. Nierman

It is certified that error appears in the above-identified patent and that said Letters Patent are hereby corrected as shown below:

Col. 1, line 21, "it" should read --its--.

Col. 9, line 52, "jetted" should read --jetting--; and line 55, "jetting" should read --jetted--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*